(12) United States Patent
Benhase et al.

(10) Patent No.: US 8,190,925 B2
(45) Date of Patent: May 29, 2012

(54) SINGLE SHARED POWER DOMAIN DYNAMIC LOAD BASED POWER LOSS DETECTION AND NOTIFICATION

(75) Inventors: Linda V. Benhase, Tucson, AZ (US); John C. Elliott, Tucson, AZ (US); Robert A. Kubo, Tucson, AZ (US); Gregg S. Lucas, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 789 days.

(21) Appl. No.: 12/244,182

(22) Filed: Oct. 2, 2008

(65) Prior Publication Data

US 2010/0088533 A1 Apr. 8, 2010

(51) Int. Cl.
*G06F 1/00* (2006.01)
(52) U.S. Cl. .......................................... 713/300; 714/22
(58) Field of Classification Search .................. 713/300, 713/340; 714/22
See application file for complete search history.

(56) References Cited

U.S. PATENT DOCUMENTS

| | | | |
|---|---|---|---|
| 4,245,150 A | 1/1981 | Driscoll et al. | |
| 4,376,968 A | 3/1983 | Wueschinski et al. | |
| 5,117,324 A | 5/1992 | Johnson et al. | |
| 5,264,782 A | 11/1993 | Newton | |
| 5,404,904 A | 4/1995 | Glaser | |
| 5,781,448 A | 7/1998 | Nakamura et al. | |
| 6,061,668 A | 5/2000 | Sharrow | |
| 6,175,927 B1 | 1/2001 | Cromer et al. | |
| 6,195,754 B1 | 2/2001 | Jardine et al. | |
| 6,304,981 B1 | 10/2001 | Spears et al. | |
| 6,339,793 B1 | 1/2002 | Bostian et al. | |
| 6,345,369 B1 | 2/2002 | Kitamorn et al. | |
| 6,363,422 B1 | 3/2002 | Hunter et al. | |
| 6,772,366 B2 | 8/2004 | Nguyen et al. | |
| 6,823,475 B1 | 11/2004 | Harker | |
| 6,854,066 B1 | 2/2005 | LeFevre et al. | |
| 7,002,265 B2 | 2/2006 | Potega | |
| 7,013,399 B2 | 3/2006 | Sisler et al. | |
| 7,023,691 B1 | 4/2006 | Feight et al. | |
| 7,024,649 B2 | 4/2006 | Collmeyer et al. | |
| 7,043,647 B2 | 5/2006 | Hansen et al. | |
| 7,062,675 B1 | 6/2006 | Kemeny et al. | |
| 7,081,924 B2 | 7/2006 | Tsuda | |
| 7,082,373 B2 | 7/2006 | Holle | |

(Continued)

FOREIGN PATENT DOCUMENTS

JP 2007-172535 7/2007

OTHER PUBLICATIONS

Notice of Allowance mailed Dec. 23, 2010 for U.S. Appl. No. 11/695,297; 5 pages.

(Continued)

*Primary Examiner* — Clifford Knoll
(74) *Attorney, Agent, or Firm* — Stephen R. Tkacs; Stephen J. Walder, Jr.; Randall J. Bluestone (57) ABSTRACT

The advanced management module services in a data processing system are configured to determine the system load and provide an input to the early power off warning detection logic that evaluates the power system state to detect a condition when power resources are insufficient to maintain the write caching storage system power within defined acceptable limits. The early power off warning detection logic generates a notification based on the system load and the available power supply resources to maintain maximum availability and reliability characteristics.

20 Claims, 4 Drawing Sheets

U.S. PATENT DOCUMENTS

| | | |
|---|---|---|
| 7,088,078 B2 | 8/2006 | Lu |
| 7,243,243 B2 | 7/2007 | Gedeon |
| 7,299,385 B2 | 11/2007 | Voigt |
| 7,321,174 B2 | 1/2008 | Jones et al. |
| 7,747,900 B2 | 6/2010 | Elliott et al. |
| 2003/0095366 A1 | 5/2003 | Pellegrino |
| 2004/0022285 A1 | 2/2004 | Romm |
| 2004/0070278 A1 | 4/2004 | Divan et al. |
| 2006/0112305 A1 | 5/2006 | Cagno et al. |
| 2006/0123253 A1 | 6/2006 | Morgan et al. |
| 2006/0140211 A1 | 6/2006 | Huang et al. |
| 2006/0146461 A1 | 7/2006 | Jones et al. |
| 2006/0161794 A1 | 7/2006 | Chiasson et al. |
| 2006/0242463 A1 | 10/2006 | Yasui et al. |
| 2007/0278020 A1 | 12/2007 | Harris et al. |
| 2008/0178049 A1 | 7/2008 | Elliott et al. |
| 2008/0244283 A1 | 10/2008 | Elliott et al. |
| 2008/0244311 A1 | 10/2008 | Elliott et al. |

OTHER PUBLICATIONS

Response to Office Action filed with the USPTO on Mar. 24, 2010 for U.S. Appl. No. 11/695,297; 13 pages.

Notice of Allowance mailed Jul. 9, 2010 for U.S. Appl. No. 11/695,297; 7 pages.

Lee et al., "A Piecewise Global Small-Disturbance Voltage-Stability Analysis of Structure-Preserving Power System Models", IEEE Transactions on Power Systems, vol. 10, Issue 4, Nov. 1995, pp. 1963-1971.

U.S. Appl. No. 11/695,297.

U.S. Appl. No. 11/695,322.

| POWER SUPPLY | MAX SUSTAINED OUTPUT |
|---|---|
| PSU1 | 1000W |
| PSU2 | 1000W |
| PSU3 | 1000W |
| PSU4 | 1000W |

FIG. 3B

| LOAD CONDITION | STATE | MAX LOAD |
|---|---|---|
| LD0 | 00 | <=1000W |
| LD1 | 01 | <=2000W |
| LD2 | 10 | <=3000W |
| LD3 | 11 | <=4000W |

SINGLE SHARED POWER DOMAIN DYNAMIC LOAD BASED POWER LOSS DETECTION AND NOTIFICATION

BACKGROUND OF THE INVENTION

1. Field of the Invention

The present application relates generally to an improved data processing apparatus and method and more specifically to an apparatus and method for single shared power domain dynamic load based power loss detection and notification.

2. Background of the Invention

In some systems, a collection of servers is interconnected into a server system, sharing high-speed fabric topologies, such as in BladeCenter® systems. "BladeCenter" is a trademark of International Business Machines Corporation in the United States, other countries, or both. A BladeCenter® system is a server architecture that houses multiple server modules ("blades") in a single chassis. Blade servers are widely used in data centers to save space and improve system management. Either self-standing or rack mounted, the chassis provides the power supply. Each blade may have its own CPU, memory, and hard disk. Blade servers generally provide their own management systems and may include a network or storage switch.

The original BladeCenter® system, BC-1, also referred to as BC-E, has 14 blade slots. Power supplies have been upgraded through the life of the chassis from the original 1200 to 1400, 1800, and the current 2000 W. The BC-1 has shared media tray with optical drive, floppy drive and universal serial bus (USB) port, one (upgradable to two) management module, two (upgradable to four) power supplies, two redundant high-speed blowers, two slots for Gigabit Ethernet switches (can also support optical or copper pass-through), two slots for optional switch or pass-through modules. The BC-1 can also support additional Ethernet, Fibre Channel, InfiniBand or Myrinet 2000 functions.

The BC-H BladeCenter® system is an upgraded design with high-speed fabric options. The BC-H provides four slots for optional high-speed switches or pass-through modules and can support 10Gig Ethernet or InfiniBand 4X. The BC-H BladeCenter® system also provides optional hard-wired serial port capability. The BC-S BladeCenter® system targets mid-sized customers by offering storage inside the BladeCenter® chassis. The BC-S BladeCenter® system can also use 110V power in the North American market, so it can be used outside the datacenter.

BRIEF SUMMARY OF THE INVENTION

In one illustrative embodiment, a computer program product comprises a computer recordable medium having a computer readable program recorded thereon. The computer readable program, when executed on a computing device, causes the computing device to identify a power configuration for the data processing system, determine a load condition for the identified power configuration, and provide the load condition to an early power off warning detection module. The computer readable program further causes the computing device to determine, by the early power off warning detection module, whether the load condition and power configuration lead to an unreliable power system configuration for a write caching storage system and responsive to the load condition and power configuration leading to an unreliable power system configuration for the write caching storage system, send an early power off warning notification to the write caching storage system.

In another illustrative embodiment, a method is provided in a data processing system for single shared power domain dynamic load based power loss detection and notification. The method comprises identifying a power configuration for the data processing system, determining a load condition for the identified power configuration, and providing the load condition to an early power off warning detection module. The method further comprises determining, by the early power off warning detection module, whether the load condition and power configuration lead to an unreliable power system configuration for a write caching storage system and responsive to the load condition and power configuration leading to an unreliable power system configuration for the write caching storage system, sending an early power off warning notification to the write caching storage system.

In another illustrative embodiment, a data processing system comprises a plurality of power supply units, a management module, an early power off warning detection module, and a write caching storage system. The management module is configured to identify a power configuration for the data processing system, determine a load condition for the identified power configuration, and provide the load condition to the early power off warning detection module. The early power off warning module is configured to determine whether the load condition and power configuration lead to an unreliable power system configuration for a write caching storage system and responsive to the load condition and power configuration leading to an unreliable power system configuration for the write caching storage system, send an early power off warning notification to the write caching storage system.

These and other features of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

The illustrative embodiments provide a mechanism for single shared power domain dynamic load based power loss detection and notification. In systems that provide a shared power among multiple independent system or user contexts, the load presented to the power network may be variable based on the number and characteristics of the power users, which may include blades, input/output modules, disk storage subsystem storage modules, common shared devices, management modules, and the like. The mechanisms in the illustrative embodiments utilize the management module services to determine the system load and to provide an input to early power off warning (EPOW) detection logic that evaluates the power system state to detect an EPOW condition when insufficient power resources are present to maintain a write caching storage system power within defined acceptable limits. Based on the system load and the available power supply resources, the EPOW detection logic generates a notification to maintain maximum availability and reliability characteristics.

Figure 1:
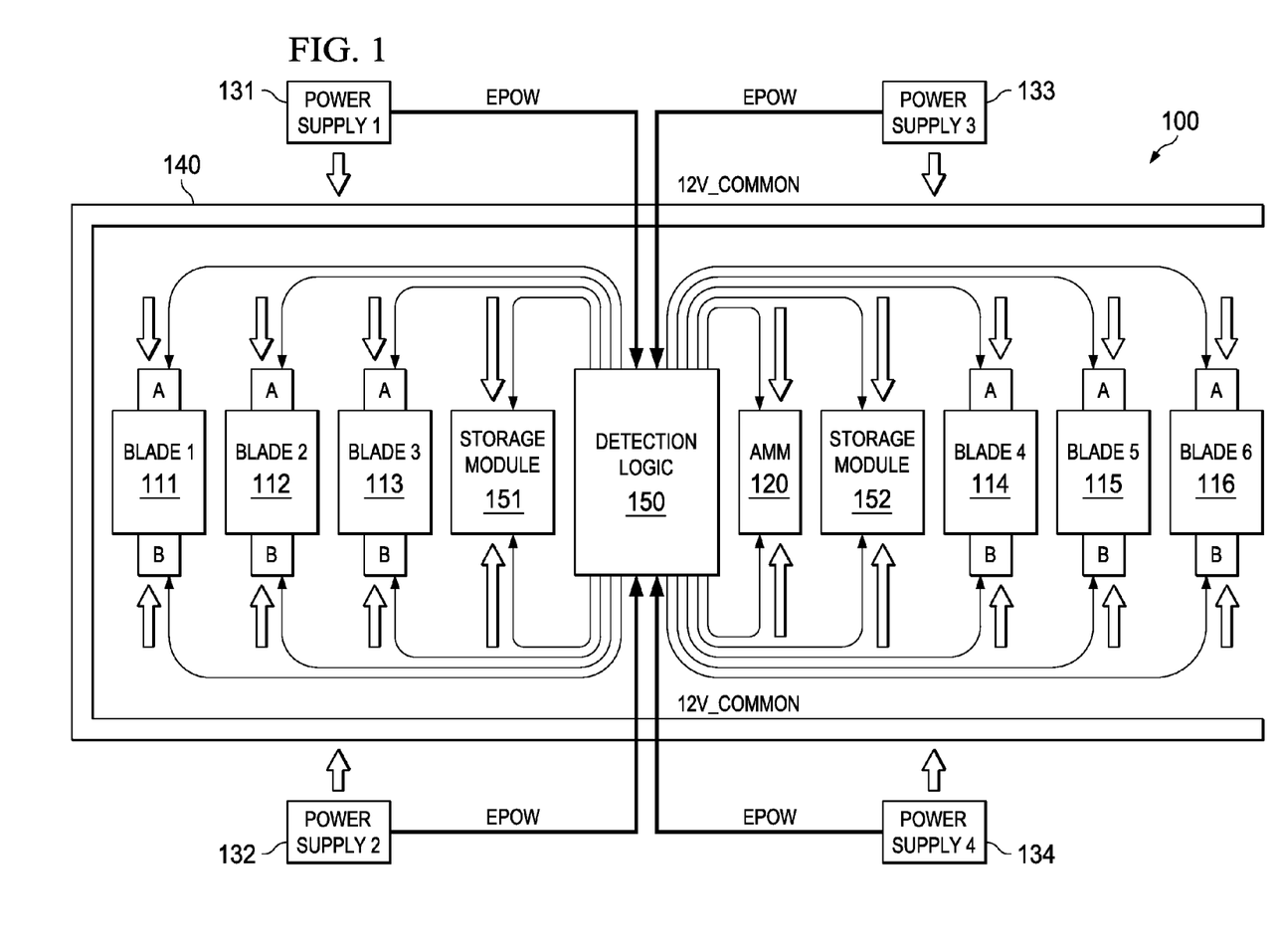
FIG. 1 illustrates an example power configuration in which aspects of the illustrative embodiments may be implemented.

Thus, the illustrative embodiments may be utilized in many different types of data processing environments including a single data processing device, etc. In order to provide a context for the description of the specific elements and functionality of the illustrative embodiments, FIG. 1 is provided hereafter as an example environment in which aspects of the illustrative embodiments may be implemented. While the description following FIG. 1 will focus primarily on a single data processing device implementation, this is only an example and is not intended to state or imply any limitation with regard to the features of the present invention.

With reference now to the figures and in particular with reference to FIG. 1, an example diagram of a data processing environment is provided in which illustrative embodiments of the present invention may be implemented. It should be appreciated that FIG. 1 is only an example and is not intended to assert or imply any limitation with regard to the environments in which aspects or embodiments of the present invention may be implemented. Many modifications to the depicted environment may be made without departing from the spirit and scope of the present invention.

FIG. 1 illustrates an example power configuration in which aspects of the illustrative embodiments may be implemented. Data processing system 100 may be a BC-S BladeCenter® system, for example, having up to six blades 111-116, advanced management module (AMM) 120, and power supplies 131-134. Blades 111-116 may be server blades, storage blades, input/output (I/O) blades, or the like. Advanced management module 120 provides management functions for the BladeCenter® system. In the depicted example, storage modules 151 and 152 may be write caching storage systems.

Power supplies 131-134 provide power to a 12V common rail 140, which provides power to blades 111-116, AMM 120, and storage modules 151 and 152. Power supplies 131-134 provide early power off warning (EPOW) signals to a detection logic 150, which then provides EPOW to blades 111-116, AMM 120, and storage modules 151 and 152. Detection logic 150 is configured to hold off the assertion of an EPOW event until the last power supply in a power domain drops its output voltage. This is to mitigate false EPOW signaling that could result in reduced performance of storage modules 151 and 152. AMM 120 may invoke BC-S power policy decisions upon any EPOW event.

At 110VAC line voltage, the BC-S is configured as an N+1 power solution, where N is the minimum number of power supplies required to provide for normal operation and the "1" may be considered a spare power supply. If there are N+1 power supplies, then the data processing system can lose one power supply and still maintain normal operation. Detection logic 150 informs blades 111-116 and AMM 120 of any EPOW event in the normal manner. Here, "normal manner" refers to how the EPOW is distributed to the blades, as opposed to "abnormal" manner, which refers to how or when the EPOW is distributed to the storage solutions. That is, for example, the storage solutions may not be given the EPOW signal until the last power supply asserts its EPOW signal. This is to mitigate false EPOW signaling that could result in reduced performance of the storage sub-system in BC-S. AMM 120 invokes the BC-S power policy decisions upon any EPOW event.

In the 110VAC line voltage scenario, advanced management module (AMM) 120 code may determine if a power supply is installed in the chassis by means of monitoring the proper inter-integrated circuit (I2C) register for the power supply "presence detect" signal. If a power supply is not installed, AMM 120 may deactivate the appropriate EPOW enable signal and remove the uninstalled power supply from the decision tree logic. This is to prevent an uninstalled power supply/EPOW circuitry from asserting a false EPOW signal.

Also, in the 110VAC line voltage scenario, one may observe that dependent upon the load in a system in a N+1 power environment that waiting for the last remaining power supply to assert its EPOW signal may result in an unstable power configuration. Unstable power conditions may result in unpredictable write caching storage system behavior and risk customer data integrity in a power loss scenario.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. For example, a data processing system may have more or fewer blades, more or fewer power supply units, and so forth. The data processing system may have a different voltage rail, for example. Essentially, the hardware in FIG. 1 may be any known or later developed data processing system without architectural limitation.

Figure 2:
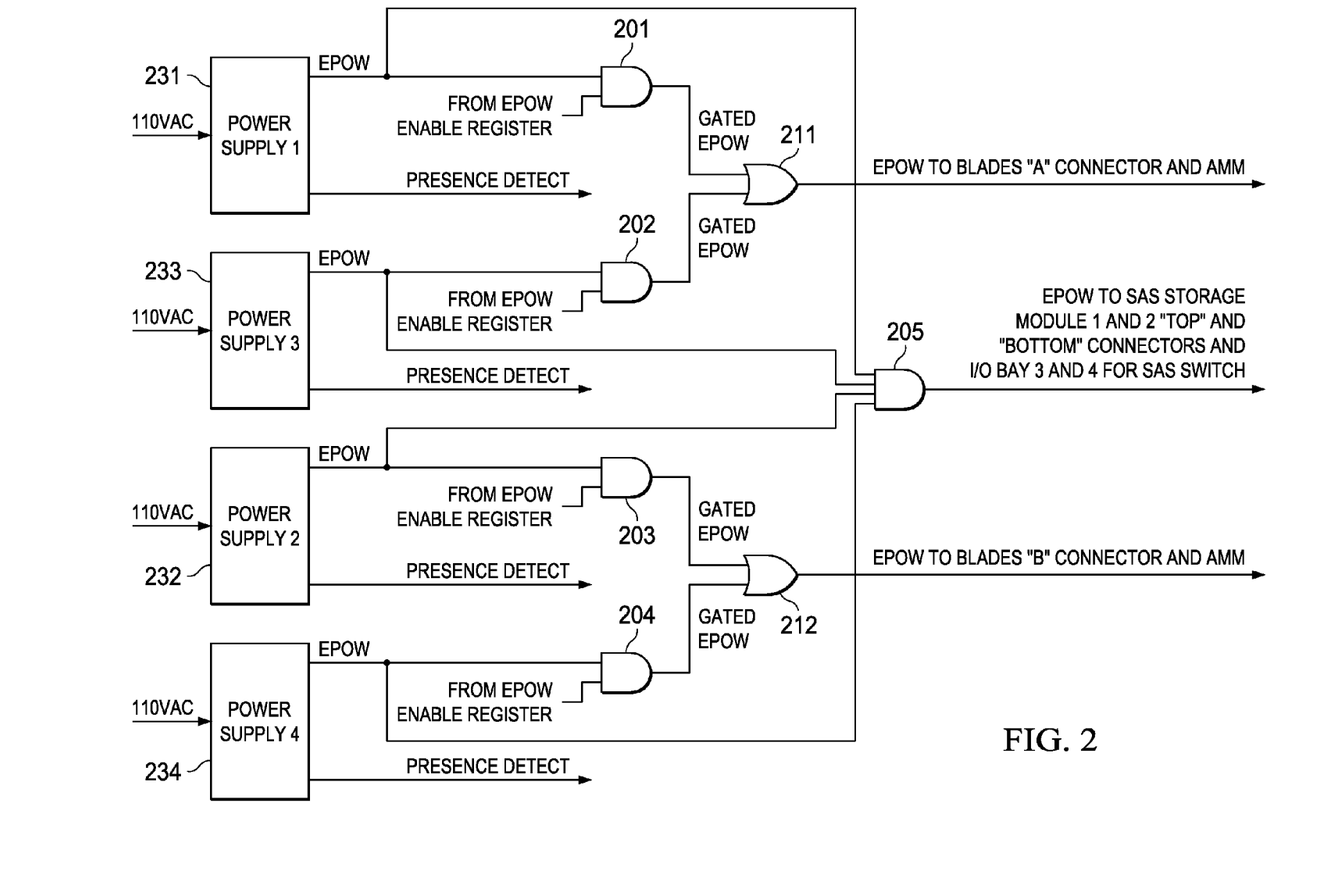
FIG. 2 depicts early power off warning signal generation logic for a data processing system in accordance with an illustrative embodiment.

FIG. 2 depicts early power off warning signal generation logic for a data processing system in accordance with an illustrative embodiment. Power supplies 231-234 receive 110VAC. A power supply, such as power supply 1 231, for example, asserts the EPOW signal at least 10 ms prior to the power supply dropping its output voltage. The power supply may drop output voltage due to, for example, loss of line voltage, over current, output regulation, or the like. Power supply 1 231 provides an EPOW signal to AND gate 201; power supply 3 233 provides an EPOW signal to AND gate 202; power supply 2 232 provides an EPOW signal to AND gate 203; and, power supply 4 234 provides an EPOW signal to AND gate 204. AND gates 201-204 perform a logical AND operation on its received EPOW signal and a binary value from an EPOW enable register. Thus, the advanced management module may set an EPOW enable bit in an EPOW enable register for each power supply, based on its respective presence detect signal, and disable the respective bit for an uninstalled power supply. That is, if power supply 4 234 is uninstalled, for example, then AND gate 204 will not assert its output.

AND gate 201 and AND gate 202 provide output to OR gate 211. If either EPOW from power supply 1 231 or EPOW from power supply 3 233 is asserted, and enabled in the EPOW enable register, then OR gate 211 will assert the EPOW signal to the "A" connector of the blades and the "A" connector of the advanced management module. AND gate 203 and AND gate 204 provide output to OR gate 212. If either EPOW from power supply 2 232 or EPOW from power supply 4 234 is asserted, and enabled in the EPOW enable register, then OR gate 212 will assert the EPOW signal to the "B" connector of the blades and the "B" connector of the advanced management module.

Power supplies 231-234 also provide an EPOW signal to AND gate 205. Thus, AND gate 205 performs an AND operation on all of the EPOW signals from power supplies 231-234. If all of the power supplies 231-234 assert their EPOW signals, then AND gate 205 asserts the EPOW signal to storage modules and I/O bays. In accordance with an illustrative embodiment, the advanced management module services are configured to determine the system load and provide an input to the EPOW detection logic that evaluates the power system state to detect a condition when power resources are insufficient to maintain the write caching storage system power within defined acceptable limits. The EPOW detection logic generates a notification based on the system load and the available power supply resources to maintain maximum availability and reliability characteristics.

Figure 3A:
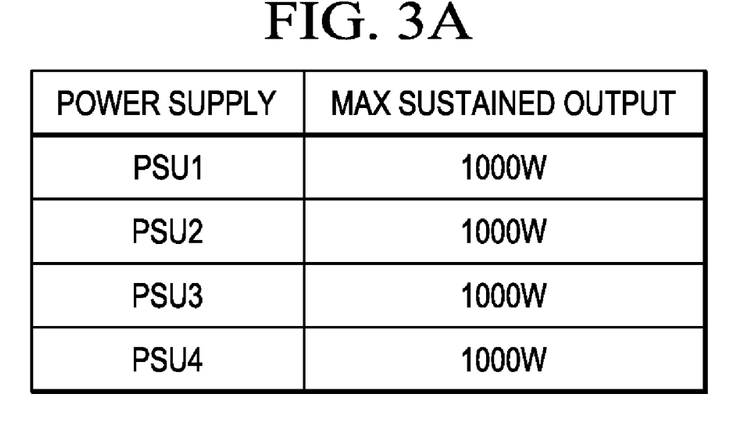
FIG. 3A is a table illustrating characteristics of power supply units in accordance with an illustrative embodiment.

FIG. 3A is a table illustrating characteristics of power supply units in accordance with an illustrative embodiment. Power supply unit 1, which may be power supply 131 in FIG. 1, or power supply 231 in FIG. 2, for example, has a maximum sustained output of 1000 W. Similarly, power supply unit 2, power supply unit 3, and power supply unit 4 have a maximum sustained output of 1000 W.

Figure 3B:
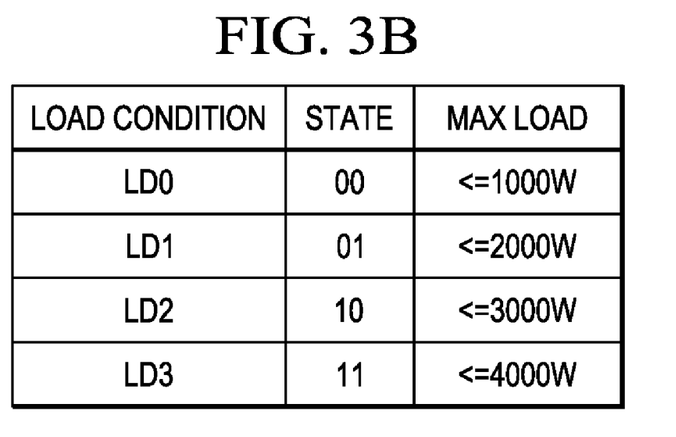
FIG. 3B is a table illustrating load conditions that describe allowable power supply conditions to a total data processing system in accordance with an illustrative embodiment.

FIG. 3B is a table illustrating load conditions that describe allowable power supply conditions to a total data processing system in accordance with an illustrative embodiment. For example, load condition 0, with a (binary) state of 00, indicates a maximum load that is less than or equal to 1000 W is present in the system. In load condition 1 (state 01), 2000 W or less of total power load is present in the system, and so on.

Relating the two sets of data shown in FIGS. 3A and 3B, for a power system configuration with one power supply unit available, the system can operate reliably in load condition zero (LD0) or less. For a power system configuration with two power supplies available (e.g., PSU1 and PSU2), the system can operate reliably in load condition 1 (LD1) or less. The load condition refers to the acceptable condition against which the actual load is compared.

Figure 4:
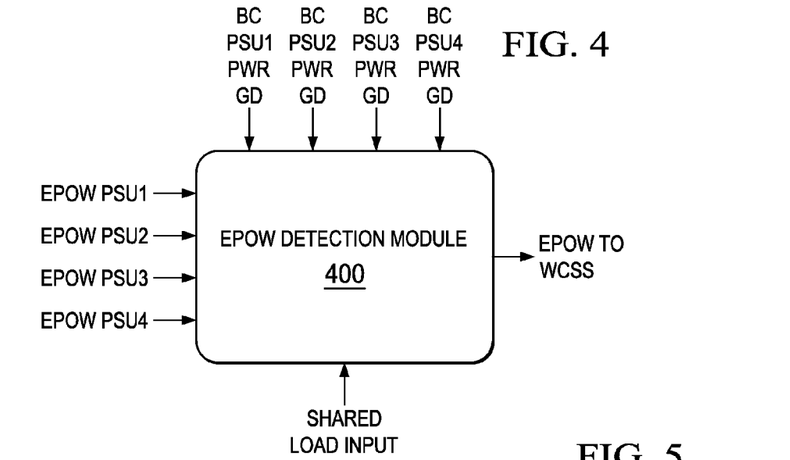
FIG. 4 illustrates the inputs and outputs the early power off warning detection module uses to provide the early power off warning to the write caching storage system in accordance with an illustrative embodiment.

FIG. 4 illustrates the inputs and outputs the early power off warning detection module uses to provide the early power off warning to the write caching storage system in accordance with an illustrative embodiment. The management module may calculate the load condition and provide that input to the detection module. Early power off warning (EPOW) detection module 400 receives as input the EPOW outputs from the power supply units (EPOW PSU1, EPOW PSU2, EPOW PSU3, and EPOW PSU4), the shared load input (load condition LD(n)), and the BladeCenter® system power supply unit good states. A given power supply good state indicates whether the power supply unit is present and providing an amount of power within an acceptable range, which may be predetermined or may be determined dynamically. EPOW detection module 400 then uses these inputs to determine the corresponding conditions to detect an actual power event that leads to an unreliable system power configuration. EPOW detection module 400 then provides system notifications, such as EPOW event notifications, to the write caching storage system.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
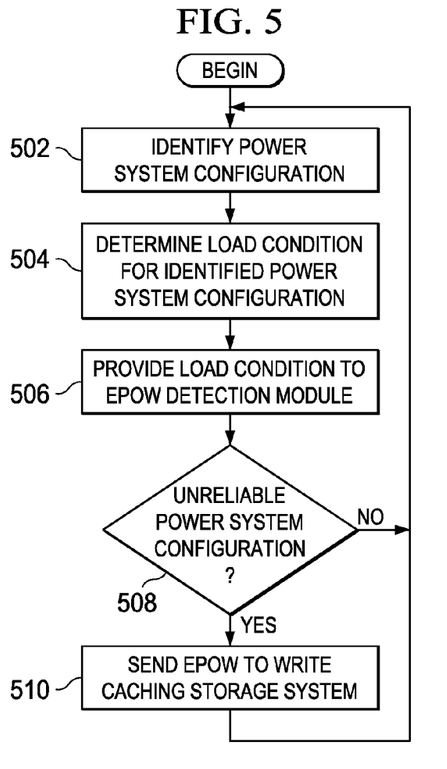
FIG. 5 is a flowchart illustrating operation of an early power off warning detection module in accordance with an illustrative embodiment.

FIG. 5 is a flowchart illustrating operation of an early power off warning detection module in accordance with an illustrative embodiment. Operation begins, and the management module identifies the data processing system power system configuration (block 502). For example, the management module may determine a number of installed and operational power supplies providing power to the common voltage rail. Then, the management module determines a load condition for the identified power system configuration (block 504). The management module then provides the load condition to the early power off warning (EPOW) detection module (block 506).

The EPOW detection module receives as input the EPOW outputs from the power supply units (EPOW PSU1, EPOW PSU2, EPOW PSU3, and EPOW PSU4), the shared load input (load condition LD(n)), and the BladeCenter® system power supply unit good states. The EPOW detection module then uses these inputs to determine whether the corresponding conditions lead to an unreliable system power configuration (block 508). If the load conditions do not lead to an unreliable system power configuration, operation returns to block 502 to identify the power system configuration. If the load condition does lead to an unreliable system power configuration in block 508, then the EPOW detection module provides an EPOW event notification to the write caching storage system (block 510). Thereafter, operation returns to block 502 to identify the power system configuration.

Thus, the illustrative embodiments provide mechanisms for single shared power domain dynamic load based power loss detection and notification. In systems that provide a shared power among multiple independent system or user contexts, the load presented to the power network may be variable based on the number and characteristics of the power users, which may include blades, input/output modules, disk storage subsystem storage modules, common shared devices, management modules, and the like. The mechanism in the illustrative embodiments utilizes the management module services to determine the system load and to provide an input to early power off warning (EPOW) detection logic that evaluates the power system state to detect an EPOW condition when insufficient power resources are present to maintain a write caching storage system power within defined acceptable limits. Based on the system load and the available power supply resources, the EPOW detection logic generates a notification to maintain maximum availability and reliability characteristics.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer recordable medium having a computer readable program recorded thereon, wherein the computer readable program, when executed on a computing device, causes the computing device to:
  identify a power configuration for the data processing system;
  determine a load condition for the identified power configuration;
  provide the load condition to an early power off warning detection module;

determine, by the early power off warning detection module, whether the load condition and power configuration lead to an unreliable power system configuration for a write caching storage system; and responsive to the load condition and power configuration leading to an unreliable power system configuration for the write caching storage system, send an early power off warning notification to the write caching storage system.

2. The computer program product of claim 1, wherein the data processing system is configured to receive power from a plurality of power supply units and wherein identifying the power configuration for the data processing system comprises:

receiving a power supply good state from each of the plurality of power supply units, wherein a given power supply good state indicates whether its respective power supply unit is present and providing an acceptable amount of power.

3. The computer program product of claim 2, wherein each of the plurality of power supply units is configured to provide an early power off warning signal responsive to a potential power failure event and wherein identifying the power configuration for the data processing system comprises:

receiving an early power off warning signal from each of the plurality of power supply units.

4. The computer program product of claim 3, wherein determining the load condition for the identified power configuration comprises:

determining the load condition for the identified power configuration based on the power supply good states of the plurality of power supply units and the early power off warning signals from the plurality of power supply units.

5. The computer program product of claim 1, wherein determining the load condition for the identified power configuration comprises:

determining a maximum acceptable load for the identified power configuration.

6. The computer program product of claim 5, wherein determining whether the load condition and power configuration lead to an unreliable power system configuration for the write caching storage system comprises:

identifying an actual shared load of the data processing system;

comparing the actual shared load of the data processing system to the maximum acceptable load for the identified power configuration; and responsive to the actual shared load exceeding the maximum acceptable load for the identified power configuration, determining that the load condition and the power configuration lead to an unreliable power system configuration for the write caching storage system.

7. The computer program product of claim 5, wherein determining the maximum acceptable load for the identified power configuration comprises looking the load condition up in a table.

8. A method, in a data processing system, for single shared power domain dynamic load based power loss detection and notification, the method comprising:

identifying a power configuration for the data processing system;

determining a load condition for the identified power configuration;

providing the load condition to an early power off warning detection module;

determining, by the early power off warning detection module, whether the load condition and power configuration lead to an unreliable power system configuration for a write caching storage system; and responsive to the load condition and power configuration leading to an unreliable power system configuration for the write caching storage system, sending an early power off warning notification to the write caching storage system.

9. The method of claim 8, wherein the data processing system is configured to receive power from a plurality of power supply units and wherein identifying the power configuration for the data processing system comprises:

receiving a power supply good state from each of the plurality of power supply units, wherein a given power supply good state indicates whether its respective power supply unit is present and providing an acceptable amount of power.

10. The method of claim 9, wherein each of the plurality of power supply units is configured to provide an early power off warning signal responsive to a potential power failure event and wherein identifying the power configuration for the data processing system comprises:

receiving an early power off warning signal from each of the plurality of power supply units.

11. The method of claim 10, wherein determining the load condition for the identified power configuration comprises:

determining the load condition for the identified power configuration based on the power supply good states of the plurality of power supply units and the early power off warning signals from the plurality of power supply units.

12. The method of claim 8, wherein determining the load condition for the identified power configuration comprises:

determining a maximum acceptable load for the identified power configuration.

13. The method of claim 12, wherein determining whether the load condition and power configuration lead to an unreliable power system configuration for the write caching storage system comprises:

identifying an actual shared load of the data processing system;

comparing the actual shared load of the data processing system to the maximum acceptable load for the identified power configuration; and responsive to the actual shared load exceeding the maximum acceptable load for the identified power configuration, determining that the load condition and the power configuration lead to an unreliable power system configuration for the write caching storage system.

14. The method of claim 12, wherein determining the maximum acceptable load for the identified power configuration comprises looking the load condition up in a table.

15. A data processing system, comprising:

a plurality of power supply units;

a management module;

an early power off warning detection module; and a write caching storage system, wherein the management module is configured to identify a power configuration for the data processing system, determine a load condition for the identified power configuration, and provide the load condition to the early power off warning detection module, and wherein the early power off warning module is configured to determine whether the load condition and power configuration lead to an unreliable power system configuration for a write caching storage system and responsive to the load condition and power configuration leading to an unreliable power system configuration for the write caching storage system, send an early power off warning notification to the write caching storage system.

16. The data processing system of claim 15, wherein identifying the power configuration for the data processing system comprises:

receiving a power supply good state from each of the plurality of power supply units, wherein a given power supply good state indicates whether its respective power supply unit is present and providing an acceptable amount of power.

17. The data processing system of claim 16, wherein each of the plurality of power supply units is configured to provide an early power off warning signal responsive to a potential power failure event and wherein identifying the power configuration for the data processing system comprises:

receiving an early power off warning signal from each of the plurality of power supply units.

18. The data processing system of claim 17, wherein determining the load condition for the identified power configuration comprises:

determining the load condition for the identified power configuration based on the power supply good states of the plurality of power supply units and the early power off warning signals from the plurality of power supply units.

19. The data processing system of claim 15, wherein determining the load condition for the identified power configuration comprises:

determining a maximum acceptable load for the identified power configuration.

20. The data processing system of claim 19, wherein determining whether the load condition and power configuration lead to an unreliable power system configuration for the write caching storage system comprises:

identifying an actual shared load of the data processing system;

comparing the actual shared load of the data processing system to the maximum acceptable load for the identified power configuration; and responsive to the actual shared load exceeding the maximum acceptable load for the identified power configuration, determining that the load condition and the power configuration lead to an unreliable power system configuration for the write caching storage system.

* * * * *